United States Patent [19]

Sanielevici et al.

[11] Patent Number: 6,011,816
[45] Date of Patent: *Jan. 4, 2000

[54] DIRECT DEMODULATION METHOD AND APPARATUS

[75] Inventors: Sergio A. Sanielevici, Redwood City; Abhijit A. Shah, Sunnyvale, both of Calif.

[73] Assignee: Wireless Access, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/715,441

[22] Filed: Sep. 18, 1996

[51] Int. Cl.⁷ .................................................. H04L 27/22
[52] U.S. Cl. .......................... 375/324; 375/326; 329/300; 329/301
[58] Field of Search .................................. 375/324, 323, 375/344, 340, 326; 329/300, 301; 455/426, 458, 31.3

[56] References Cited

U.S. PATENT DOCUMENTS

| | | | |
|---|---|---|---|
| 4,038,686 | 7/1977 | Baker | 386/113 |
| 4,570,125 | 2/1986 | Gibson | 329/302 |
| 4,878,029 | 10/1989 | Saunier et al. | 329/341 |
| 5,293,408 | 3/1994 | Takahashi et al. | 375/349 |
| 5,402,446 | 3/1995 | Minami | 375/344 |
| 5,438,692 | 8/1995 | Mohindra | 455/24 |
| 5,446,762 | 8/1995 | Ohba et al. | 375/324 |
| 5,450,032 | 9/1995 | Mimura et al. | 329/300 |
| 5,463,664 | 10/1995 | Nakaya | 375/360 |
| 5,469,112 | 11/1995 | Lee | 329/302 |
| 5,633,895 | 5/1997 | Powell, II et al. | 375/324 |
| 5,635,876 | 6/1997 | Gerrits et al. | 331/45 |

*Primary Examiner*—Wellington Chin
*Assistant Examiner*—Congvan Tran
*Attorney, Agent, or Firm*—Blakely, Sokoloff, Taylor & Zafman LLP

[57] ABSTRACT

A demodulation circuit providing for detection of multiple zero-crossings in an FSK signal. High data rate signals are demodulated by generating, for each pair of baseband signals I and Q, additional I and Q pairs which are phase shifted from the original I and Q pair. By generating zero crossing signals for the original baseband signals and for the phase shifted signals, additional zero crossings may be detected allowing demodulation of relatively high data rate modulated signals.

17 Claims, 10 Drawing Sheets

DIRECT DEMODULATION METHOD AND APPARATUS

BACKGROUND OF THE INVENTION

1. Field of the Invention

The present invention relates to the field of demodulation of signals. In its preferred embodiment, the present invention has application in communication devices such as pagers.

2. Description of the Related Art

Pagers have gained popularity in recent years. Several key issues in the design of pagers are cost, size and power consumption. Very briefly, a pager receives radio frequency (RF) signals, converts them to digital signals, and displays resulting messages or takes other action (such as control of functions of the pager) based on the received signals. The conversion process from RF signals to digital signals requires several steps including converting the RF signal to a baseband and demodulation of the signal to digital representations of the signal. Of course, the conversion approach will vary dependent on the selection of a particular digital modulation technique.

Typical prior art approaches to conversion of the RF signal employ discrete analog circuits such as filters. Such circuits are both relatively expensive and consume significant power. An alternative prior art approach is illustrated by FIG. 1. In the circuit of FIG. 1, the FSK modulated input signal is demodulated by converting the input signal at a carrier frequency fi to baseband by mixing (using mixers 106, 107) the input signal with a local oscillator signal (from oscillator 110) having a center frequency equal to the center frequency of the modulated signal. This results in two baseband signals Ia and Qa which have a quadrature phase relationship. The resulting mixed signals are processed by comparators 112, 113, respectively to provide I and Q signal to digital phase detector 114. The phase difference between the I and Q signals may be plus or minus 90 degrees and is a function of the instantaneous frequency of the FSK modulated inputted signal. Therefore, for a positive frequency deviation, the phase difference has one sign and for a negative phase deviation, the phase difference has the opposite sign. Phase detector 114 detects the relative phase by measuring the sign of the phase deviation. It is noted that comparators 112, 113 allow use of the digital phase detector 114 removing the requirement for some analog circuitry. However, this circuit is limited in the data rate that it can handle because the information obtained from the baseband signals is limited to the determination of the time when the signal crosses zero value. Therefore, for a pair of baseband signals (I, Q), only four points (zero crossings) per cycle can be determined. As the data rate increases (or as the deviation frequency is reduced), there are not sufficient zero crossings per symbol period to provide enough information for the demodulation process. Also, the architecture in FIG. 1 is limited to demodulation of binary FSK modulation. For higher order FSK modulations, the comparators can be replaced by A/D converters; however, this complicates the digital phase detection and A/D circuitry which may lead to power consumptions too high for use in portable devices such as pagers.

Therefore, what is needed is a circuit and method which provides for efficient demodulation of a modulated signal which is transmitting data at data rates which are high relative to the frequency deviation of the modulated FSK signal.

SUMMARY OF THE INVENTION

The present invention provides an improved demodulation circuit. In the improved circuit, high data rate signals may be demodulated by generating, for each pair of baseband signals I and Q, additional I and Q pairs which are phase shifted from the original I and Q pair. By generating zero crossing signals for the original baseband signals and for the phase shifted signals, additional zero crossings may be detected allowing demodulation of relatively high data rate modulated signals.

In other embodiments, additional phase shifted baseband signals may be generated and zero crossing signals may be generated for each of these additional phase shifted baseband signals.

Figure 1:
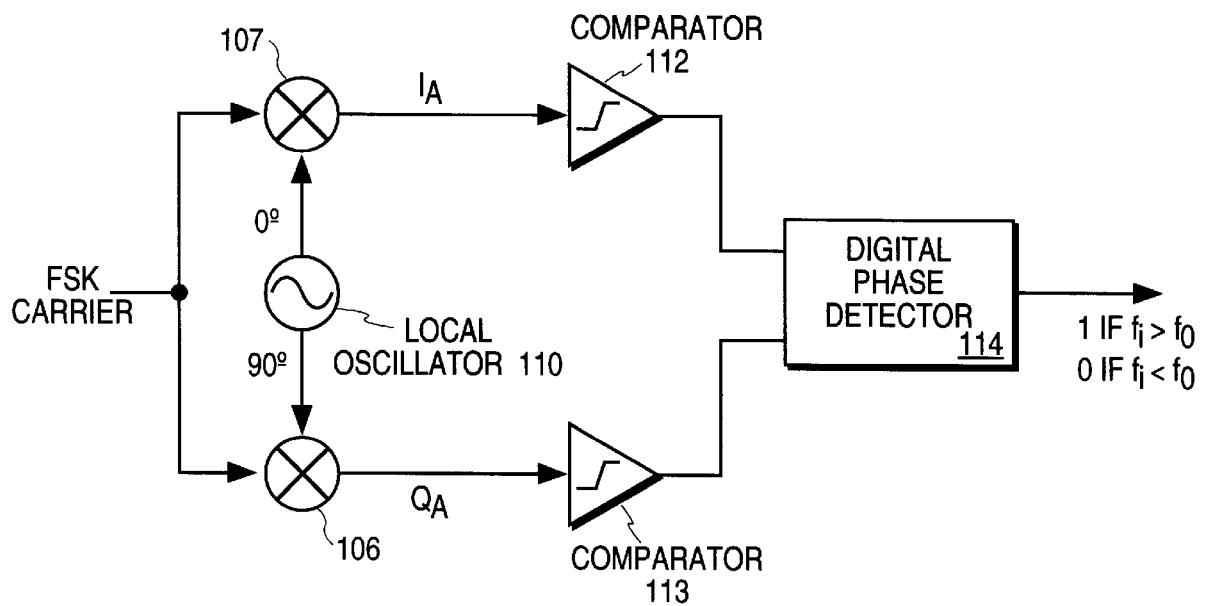
FIG. 1 is a block diagram of a prior art demodulation circuit.
Figure 3:
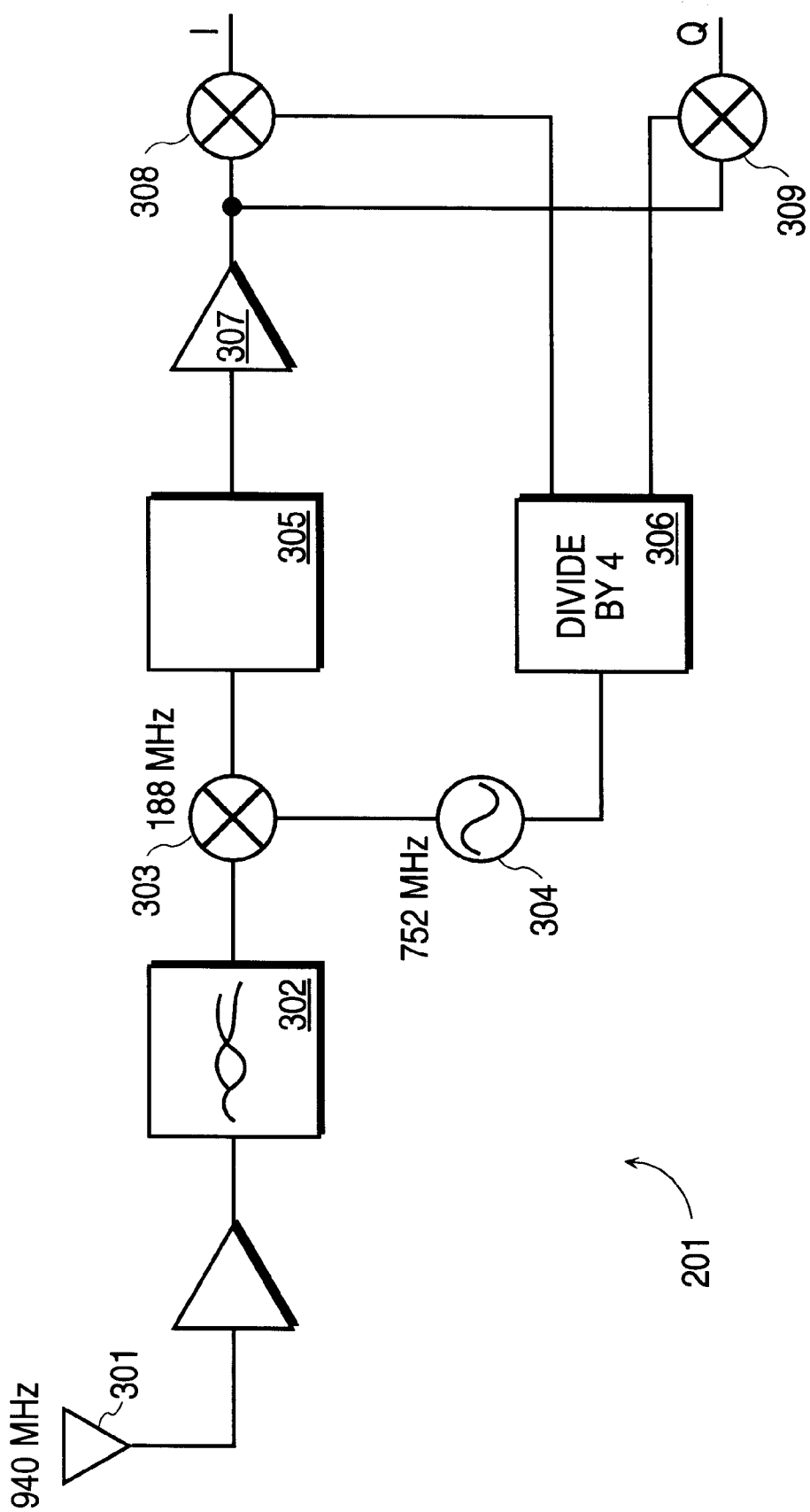
FIG. 3 is a block diagram of an RF receive circuit as may be utilized in the present invention.

For ease of reference, it might be pointed out that reference numerals in the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

I. Overview

In an embodiment of the present invention, it is desired to demodulate modulated FSK signals received by a pager. FSK will be described in greater detail below.

Figure 2:
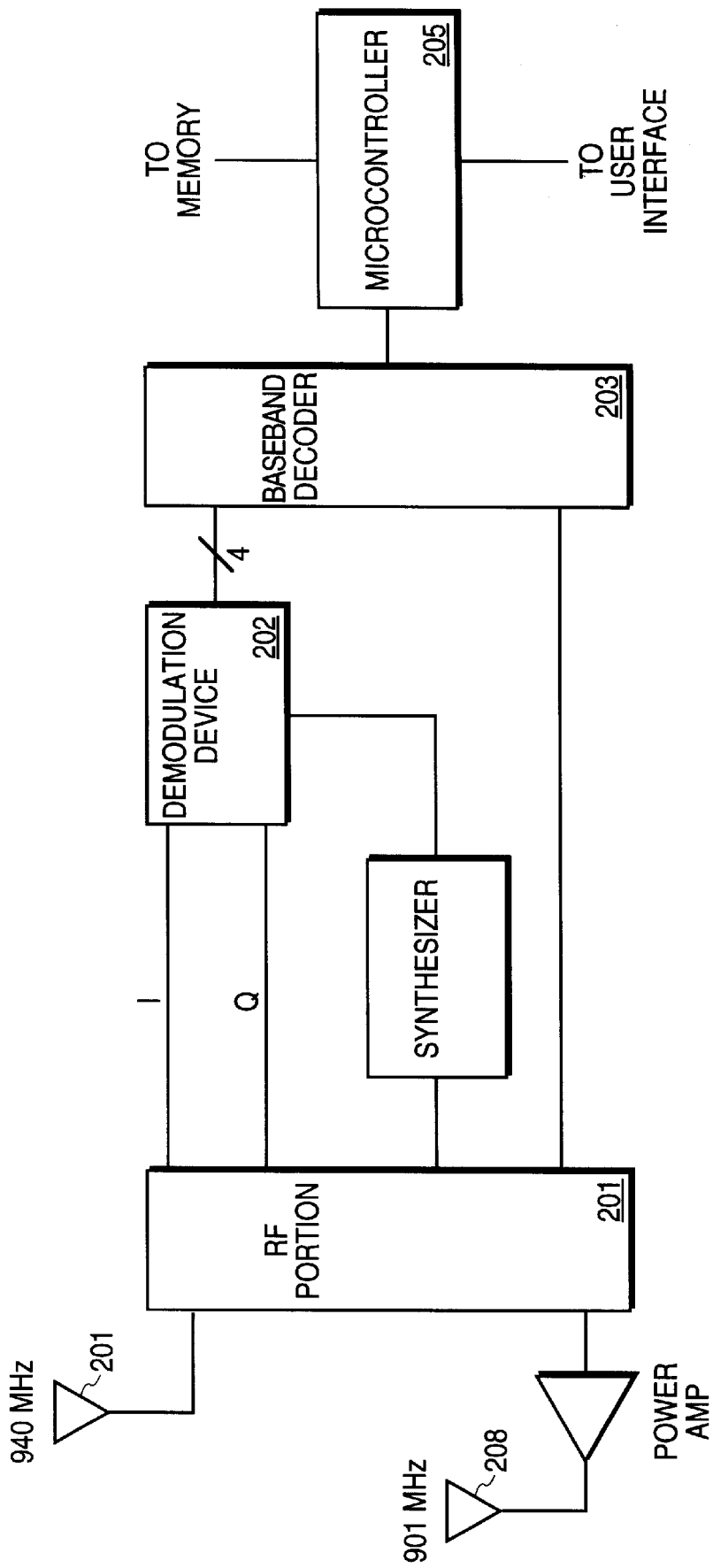
FIG. 2 is a functional block diagram of a pager as may implement the present invention.

FIG. 2 illustrates a block level diagram showing functional blocks of a pager as may implement the present invention. In the described embodiment each of the functional blocks are implemented as separate integrated circuits in a chipset. The pager comprises a 940 MHz receive antenna 201 and a 901 MHz transmit antenna 208 coupled with a RF portion 201. For purposes of describing the demodulation function of the present invention, it is sufficient to state that the RF portion 201 receives the 940 MHz input signal and provides I and Q output signals. The applicable circuitry of the RF portion 201 will be described in greater detail with reference to FIG. 3. The IQ outputs are provided as inputs to demodulation circuit 202. Demodulation circuit 202 provides zero crossing counts for each of four phases for both positive and negative deviations (8 outputs total) serialized on each of four subchannels. Circuitry of demodulation circuit 202 will be described in greater detail with reference to FIG. 4.

The zero crossing counts are provided as input to decoder 203 which provides as output demodulated decoded data (i.e., data bits) to microcontroller 205. While it is not necessary to describe in greater detail, decoder IC 203 also converts transmit data bits to modulation output which is then provided to RF portion 201 to be transmitted by antenna 208.

II. Description of FSK

Figure 5:
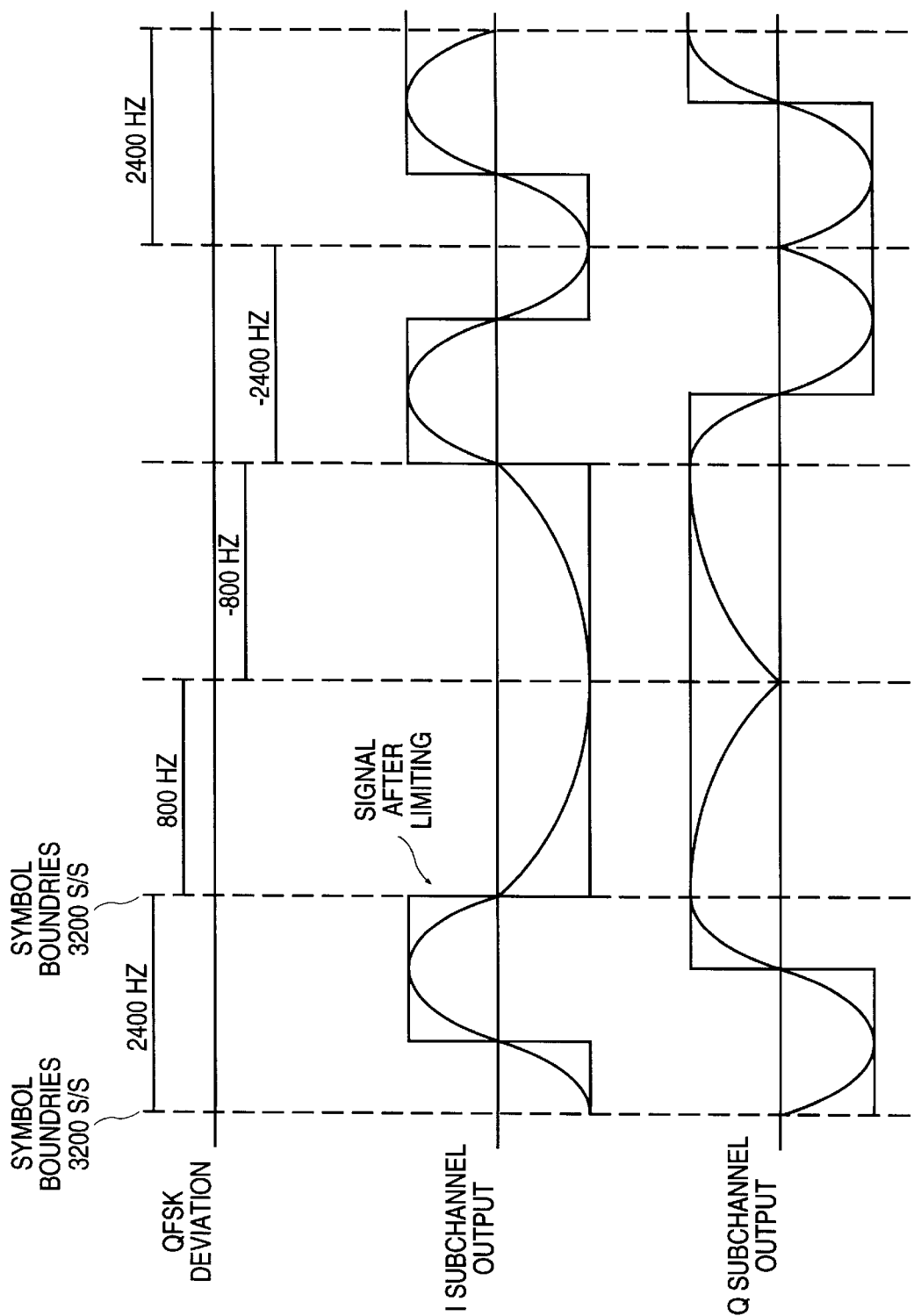
FIG. 5 is timing diagram illustrating signals as may be generated by a prior art circuit.

In frequency-shift keying (FSK), the carrier frequency, $f_c$, of a signal is deviated to one of several frequencies symmetrically located around the carrier every T seconds where the selection of the frequency depends on the value of the data. For example, for binary FSK with deviation frequencies $f_o$ and $-f_o$, the signal can be represented mathematically as:

$$s_0(t) = A_c \cos(2\pi(f_c + f_0)t)$$

or by $$s_0(t) = A_c \cos(2\pi(f_c - f_0)t)$$

depending on the data value. In quaternary FSK (or QFSK) the deviation frequency may be one of four values resulting in one of four frequencies during any symbol period. Theoretically, as T becomes smaller, the effective data transmission rate of the signal increases. However, known demodulators observe the zero crossings of the signal to determine the frequency and as T becomes smaller it becomes increasingly difficult to observe a meaningful number of zero crossings sufficient to allow demodulation of the signal. For example, FIG. 5 illustrates a signal showing I/Q outputs for a traditional direct conversion demodulator with a symbol rate of 3200 symbols/sec and, therefore, where T=1/3200 sec. As can be observed, if $f_0$=800 Hz, at most one zero crossing can be detected per symbol period.

Figure 6:
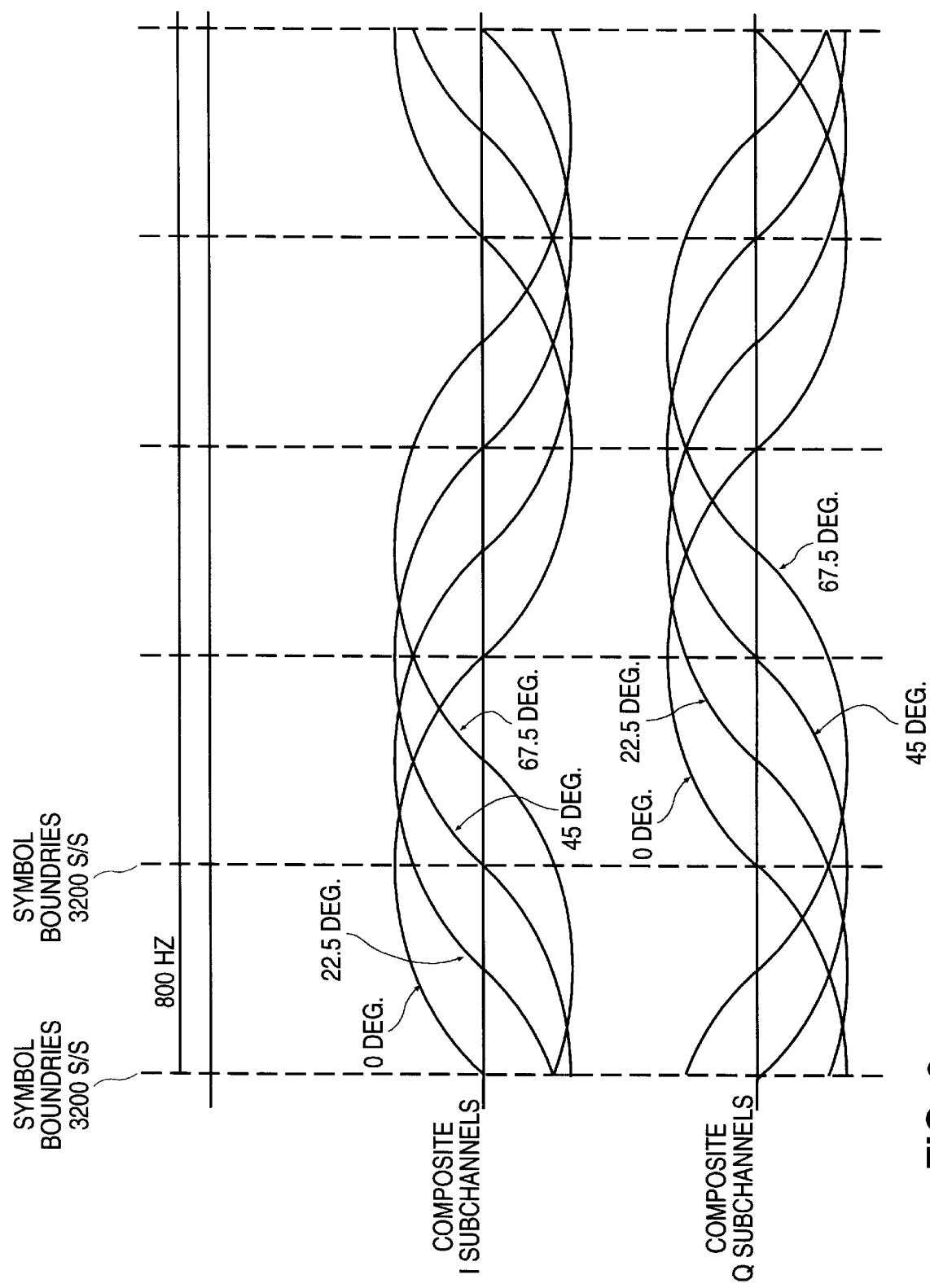
FIG. 6 is a timing diagram illustrating signals as may be generated by an embodiment of the present invention.

Importantly, the present invention has taken advantage of the fact that by increasing the number of zero crossings which may be observed during a symbol period, the accuracy of the modulator is increased. Traditionally, decreasing the symbol period has decreased the number of zero crossings and therefore reduced the accuracy of the extraction of the deviation frequency from the modulated signal. FIG. 6 illustrates a signal showing I/Q outputs for a circuit of the present invention. In a described embodiment, the number of zero crossings is increased by a factor of four using three additional phase shifted I/Q pairs of the original I/Q pair.

III. Description of an Embodiment of the Direct Demodulation Circuit of the Present Invention A. RF Receiver 201 (FIG. 3)

Turning now to FIG. 3, an RF receiver as may be utilized by the present invention is illustrated. The antenna 301 provides a 940 MHz FSK modulated signal to image reject filter 302. The image reject filter 302 removes the image frequencies and has its output coupled to mixer 303. Oscillator 304 provides a 752 MHz signal as a second input to mixer 303. Mixer 303 provides as an output a signal converted as IF frequency which is then fed as an input to filter 305. The filtered baseband signal is fed to amplifier 307. Amplifier 307 provides as an output an amplified signal which is then provided as inputs to I/Q mixers 308 and 309.

The 752 MHz signal from the oscillator is divided by 4 by divider 306. Divider 306 provides two output at 188 MHz differentiated by a 90° phase shift which are used as second inputs to mixers 308 and 309. Mixers 308 and 309 provide I and Q output signals, respectively.

B. Phase Shifting of I and Q Baseband Signals

Figure 8A:
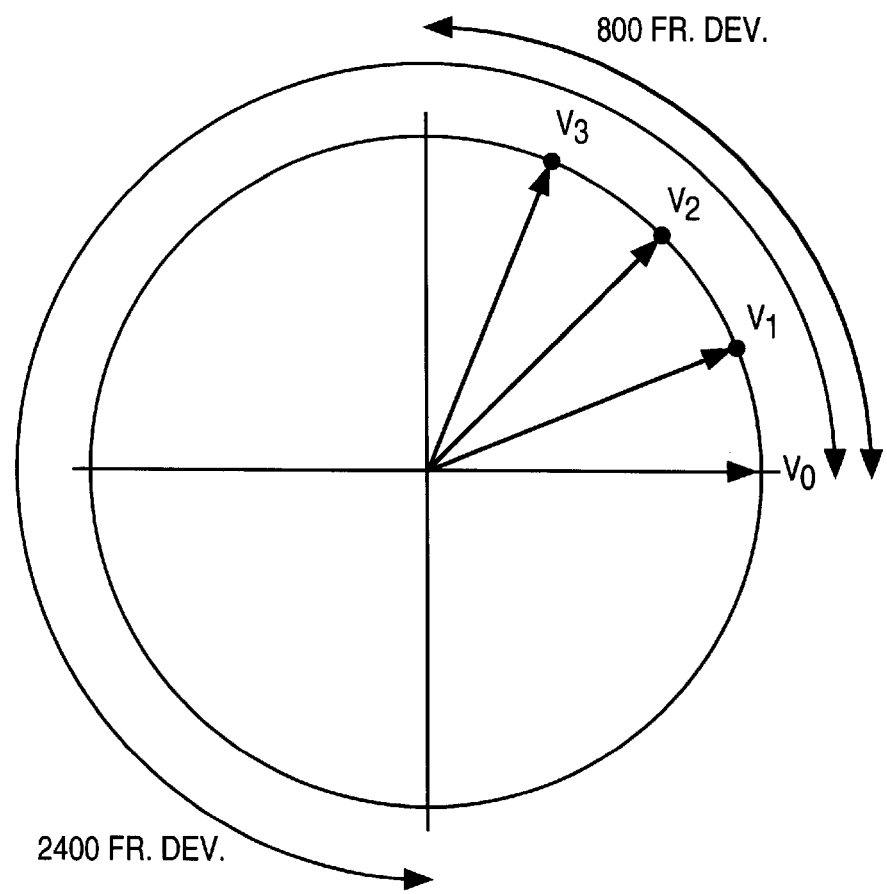
FIGS. 8(a) and 8(b) are diagrams illustrating an extra phase vector generation principle which may be employed by the present invention.

Before describing the demodulation circuit 202 in greater detail, it is worthwhile to discuss the I and Q baseband signals which are utilized in the demodulator. The I and Q baseband signals can be viewed as the real (I) and imaginary (Q) parts of a complex vector rotating at a certain rate as further illustrated by FIG. 8(a). In FIG. 8(a) the vector is normalized to a magnitude of 1 for convenience (this is valid as all the processing described is amplitude independent). The vector rotation frequency for the baseband modulated signal is the frequency deviation of the input signal and, therefore, it may be positive or negative. The instantaneous rotation frequency is the derivative of the vector phase with respect to time. If the I and Q signal zero crossing times are detected, then by using a phase detector (e.g., prior art phase detector 113 or phase detectors as will be described below), the phase and phase change sign of the vector can be determined. The phase is quantitized in 90 degree increments, as only 0, 90, 180 and 270 degree phase crossings can be measured. For this reason, a phase detector such as phase detector 113 is often termed a four-phase detector.

For an ideal FSK modulation, the phase change $\Delta\phi$ during a single symbol interval (Td) is:

$$\Delta\phi = Td * \Delta f$$

where $\Delta f$ is the frequency deviation. It has been observed by the present invention that if the frequency deviation $\Delta f$ is small, the phase change $\Delta\phi$ is small and if the phase change becomes less than 90 degrees, the described prior art demodulation circuit fails to detect the incoming information.

Figure 7:
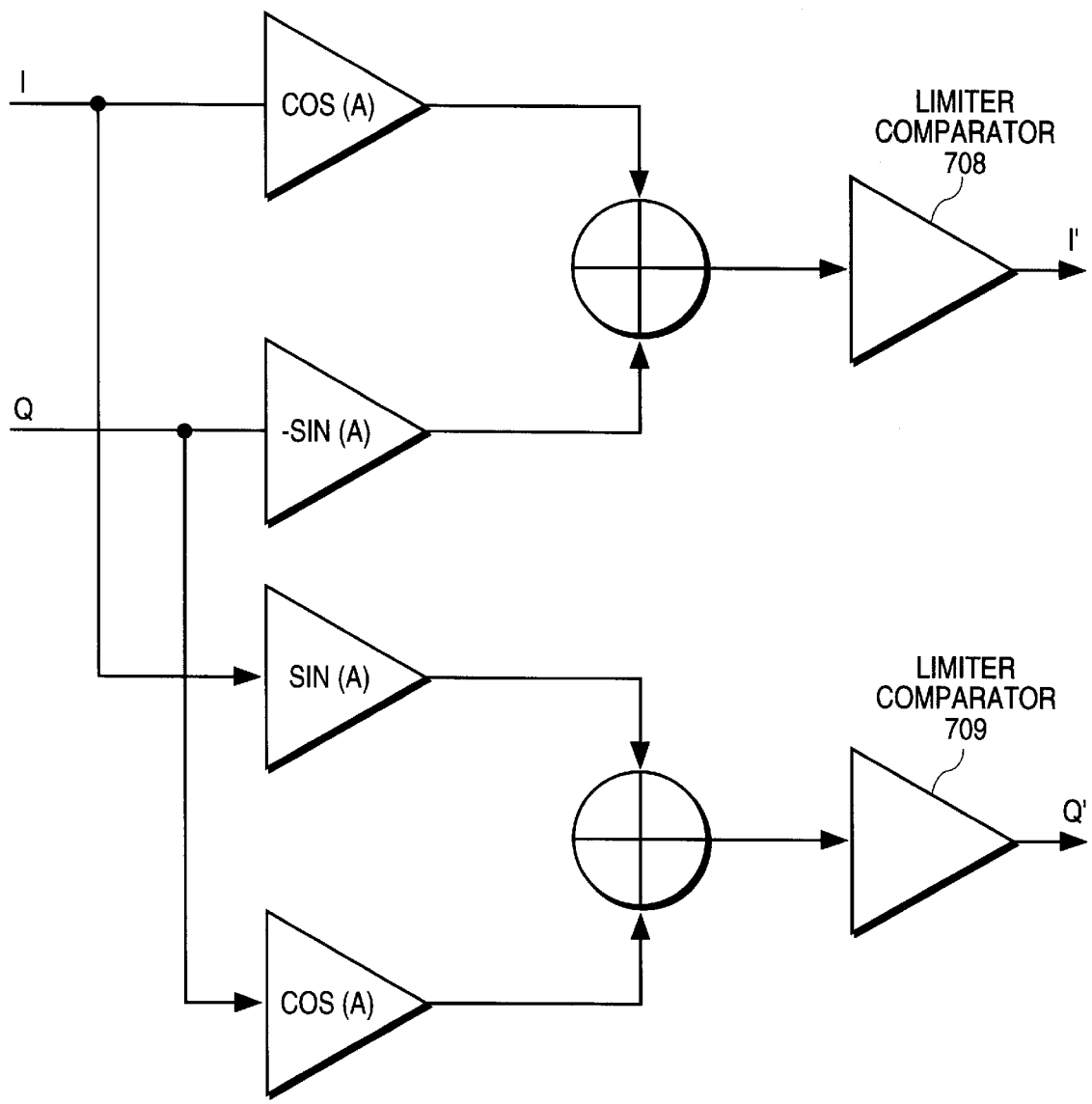
FIG. 7 is a block diagram of a phase generation circuit as may be utilized by the present invention.

In the present invention, it has been observed that it is possible to phase shift the original complex vector (I and Q) to a new complex vector (I prime or I' and Q prime or Q'). A circuit as may be utilized by the present invention for phase shifting the original complex vector is illustrated by FIG. 7 and, perhaps, better explained by FIG. 8(b).

Figure 8B:
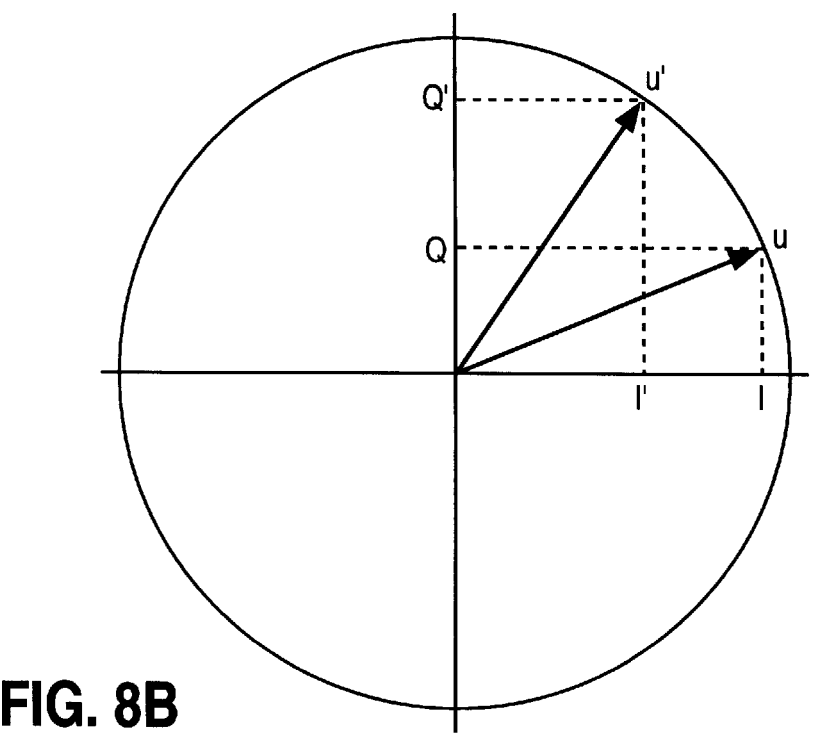

As can be seen by FIG. 8(b), the original vector U 805 may be phase shifted by the formulas:

$$I' = I \cos(A) - Q \sin(A); \text{ and}$$

$$Q' = I \sin(A) + Q \cos(A)$$

where A is the degree of phase shift desired. This phase shift circuit for providing a new vector U' may be implemented as illustrated by FIG. 7 which Figure illustrates the I input being coupled as an input into amplifier 701 which has a predetermined gain equal to cos(A) to provide a resulting signal as the output:

$$I \cos(A)$$

and having the I input being coupled as an input into amplifier 703 which has a predetermined gain equal to sin(A) to provide a resulting signal as the output:

$$I \sin(A)$$

Similarly, the Q input is coupled as an input to amplifiers 702 and 704 which have predetermined gains to provide as outputs:

$$-Q \sin(A); \text{ and}$$

$$Q \cos(A), \text{ respectively.}$$

The outputs of amplifiers 701 and 702 are coupled as inputs to adder 706 which provides a signal satisfying the equation:

$$I \cos(A) - Q \sin(A) \text{ (e.g. }\ldots, I')$$

as an output. Similarly, the outputs of amplifiers 703 and 704 are coupled as inputs to adder 707 which provides a signal satisfying the equation:

$$Q' = I \sin(A) + Q \cos(A)$$

as an output. The outputs of adders 706 and 707 are coupled to limiter/comparators 708 and 709, respectively, to provided output signals I' and Q'.

Figure 4:
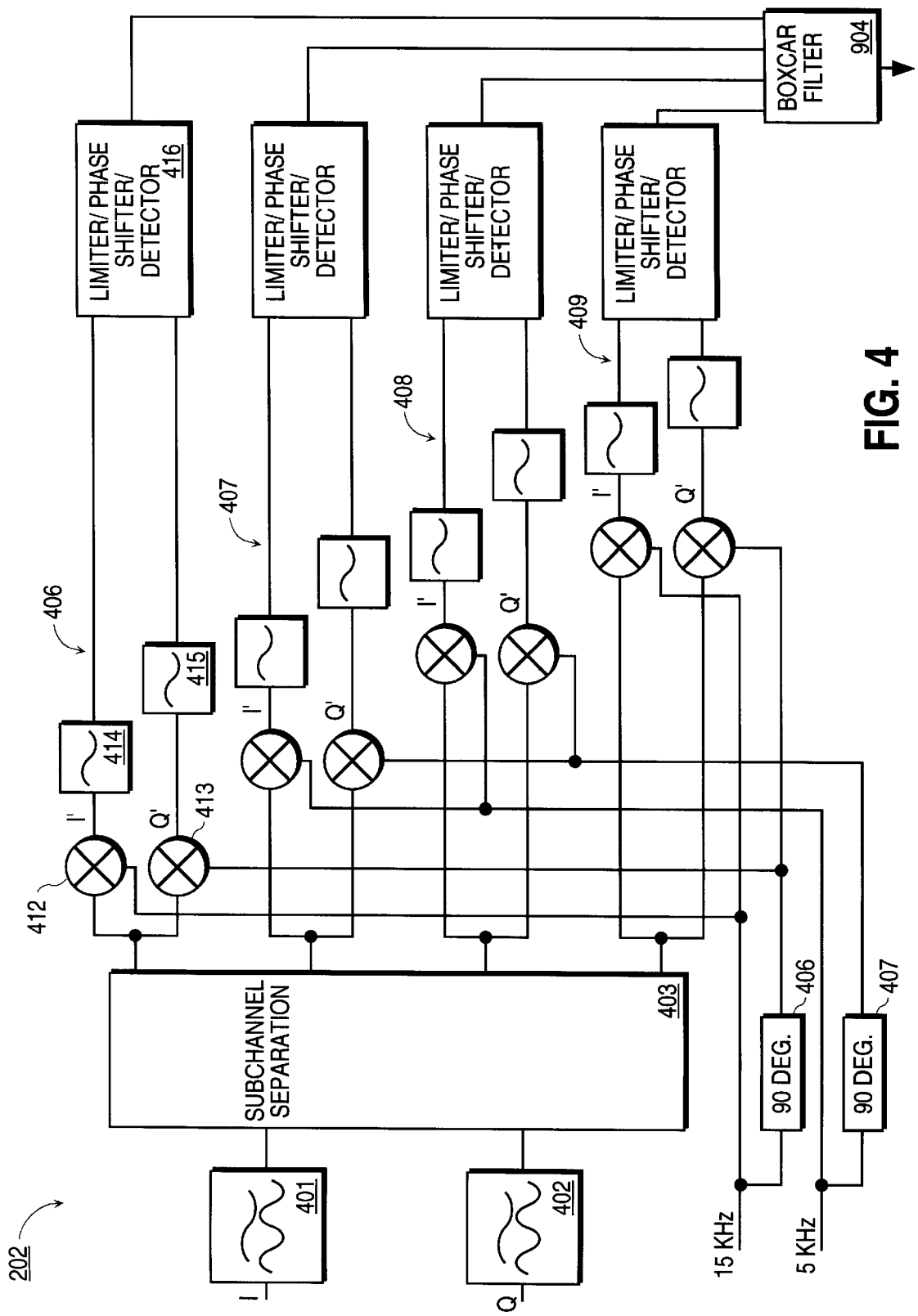
FIG. 4 is a block diagram of a demodulation device as may be utilized by the present invention.

C. Demodulation Circuit 202 (FIG. 4)

An embodiment of the demodulation circuit 202 of the circuit of the present invention is described with reference to FIG. 4.

The I and Q signals are provided as inputs to the demodulation circuit 202 from RF portion 201. The I and Q signals are coupled as inputs to filters 401 and 402 and the filtered I and Q signals are coupled to subchannel separation circuit 403.

Four subchannels containing QFSK modulated signals are separated by subchannel separation circuit 403. Circuit 403 is more fully described in co-pending application Ser. No. 08/715,442 filed Sep. 18, 1996 titled "A multilevel mixer architecture for direct conversion of FSK signals".

Following separation, the resulting I/Q signals are fed through four channels 406–409. Each channel comprises a mixer 412 for each of the I and Q signals followed by a filter 414 and a limiter/phase shifter/detector circuit 416.

Limiter/phase shifter/detector circuit 416 provides phase shifting of the I and Q signals as has been described in connection with FIG. 7. This circuit 416 is more fully described in connection with FIG. 9. In the described embodiment, the I and Q signals are phase shifted 3 times to provide phase shifted I' and Q' signals at 22.5 degrees, 45.0 degrees, and 67.5 degrees from the original signals. Thus, the circuit of FIG. 7 may be implemented four times within each of circuits 416, once with A=0, once with A=22.5, once with A=45.0 and once with A=67.5. In an alternative embodiment, it may be possible to eliminate the circuit of FIG. 7 for the A=0 case.

D. Description of Sequential Phase Detector (FIG. 9)

Figure 9:
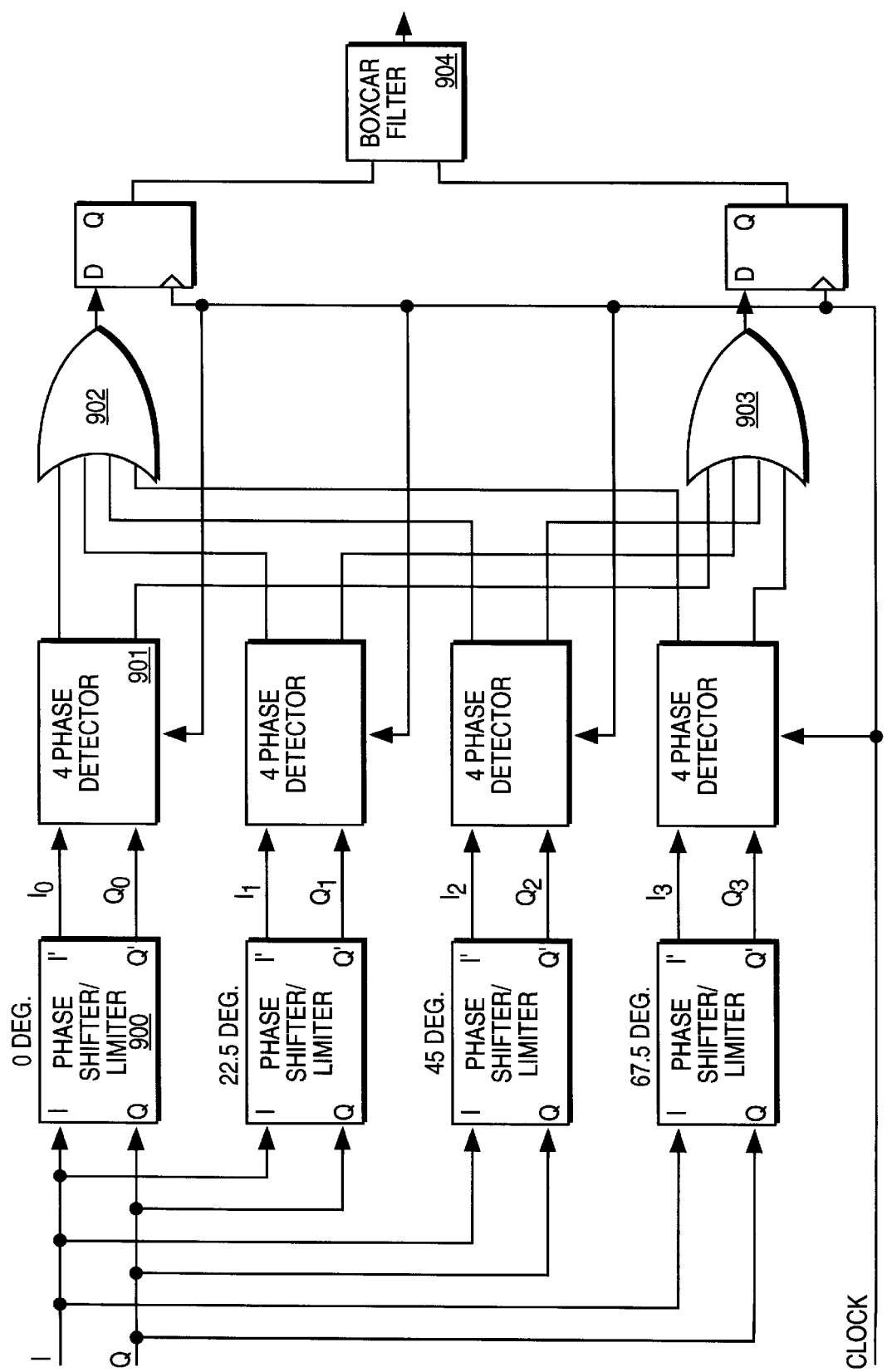
FIG. 9 is a block diagram illustrating a sixteen (16) phase detector implementation of the receiver which may be implemented by the present invention.

The limiter/phase shifter/detector circuit 416 of FIG. 4 is illustrated in block diagram form in FIG. 9. As illustrated by FIG. 4, circuit 416 is implemented four times in the described demodulation device 202, once for each of the channels 406–409.

In the embodiment of FIG. 9, all of the output signals are combined by OR gates 902 and 903. As a result, phase crossings from the various and Q channels cannot occur at the same time, but rather must occur sequentially. Therefore, the sampling clock frequency has to be sufficiently high such that consecutive zero crossings fall into different clock cycles.

As illustrated by FIG. 9, the combined signal is filtered by filter 904. Filter 904 may be a boxcar filter in a simple case. Alternatively other filters may be substituted. For example, filter 904 may be implemented as a matched FIR filter. It is desired for filter 904 to have a integration time equal or close to the symbol period.

While FIG. 9 illustrates implementation of three phase shifts (plus use of the original signal) at 22.5 degrees, 45 degrees and 67.5 degrees, any desired number N of phase shifts may be implemented to provide enough zero crossings to detect the given deviation frequency. The phase detection points may be evenly spaced around the vector rotation circle although even absent such even spacing advantages may be gained from the present invention. By using a desired number N of phase shifts, a desired resolution (e.g., number of zero crossings detected) may be obtained. This implementation offers the advantage of allowing increases in resolution with the only limits being the complexity of the circuitry involved and the gain accuracy of the phase shift amplifiers.

Figure 10:
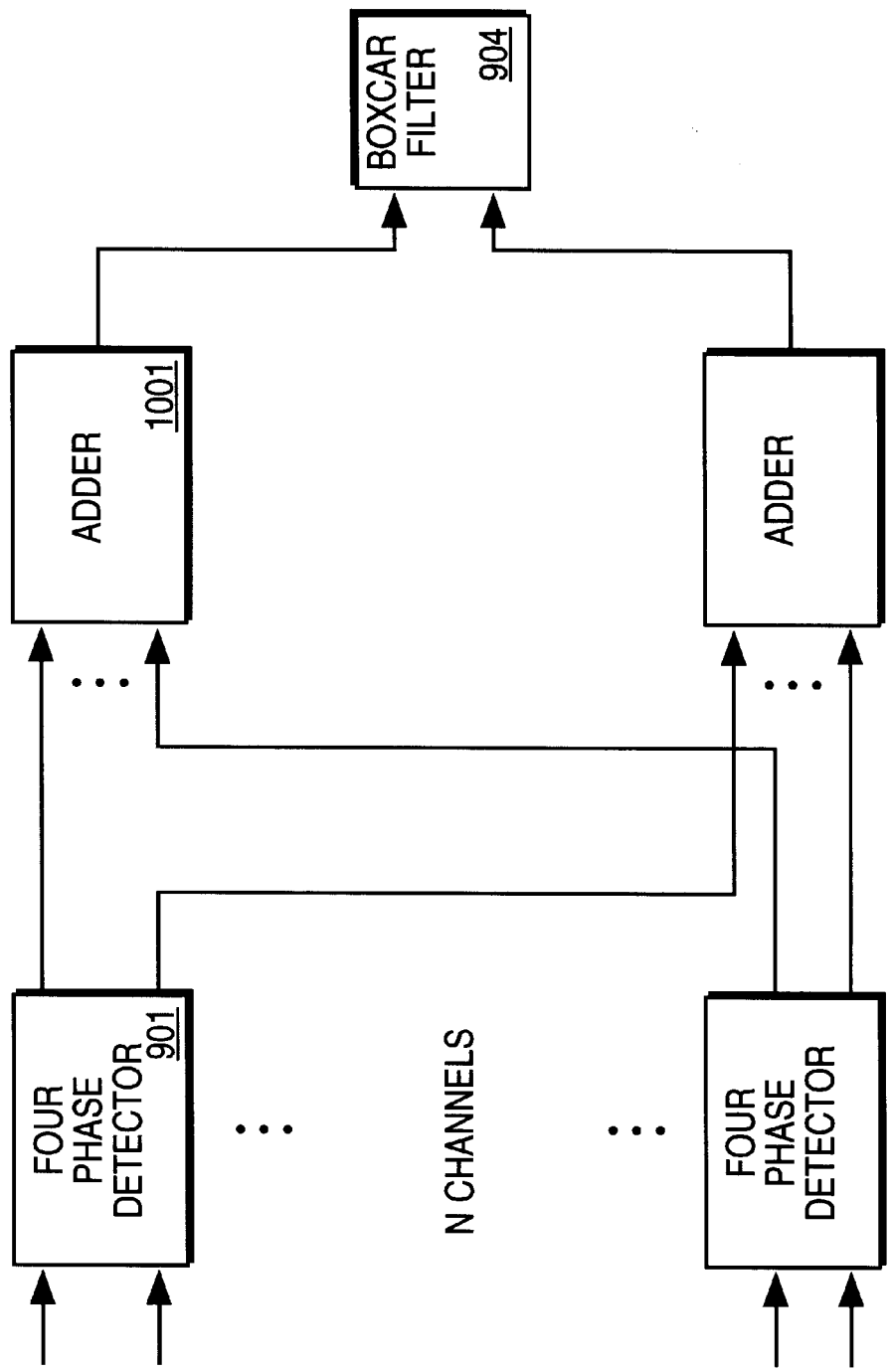
FIG. 10 is a block diagram illustrating a parallel implementation of the four (4) phase detector channel as may be utilized by the present invention.

E. Description of a Parallel Implementation of the Phase Detector of the Present Invention FIG. 10 illustrates an expandable implementation of the FSK demodulator which is obtained by connecting the outputs of N four phase detectors in parallel. The phase detector of FIG. 10 is implemented similar to the phase detector circuit of FIG. 9, except that adders 1001 are implemented in place of OR gates 902, 903. Each adder has n one bit inputs and provides one $\log_2(n)$ bit wide output.

The embodiment of FIG. 10 of the phase detector offers several advantages. For example, the operating clock frequency of this implementation is N times lower than that of the serial implementation. This provides for lower power consumption which is, of course, an important consideration in certain technologies (e.g., pagers). Further, the serial implementation requires the consecutive phase crossings fall into different clock cycles. As was discussed briefly above, a serial implementation requires, in order to ensure consecutive phase crossing occur in consecutive clock cycles, the clock frequency $f_s$ to be greater than 4 $nf_d$ where n is the number of four phase detector channels and $f_d$ is the largest frequency deviation of the frequency modulation scheme. Unlike the serial implementation, the parallel implementation allows for multiple phase crossings at the n different four phase detectors to occur simultaneously and there is no requirement that they be in separation clock cycles. Therefore, the parallel implementation may be operated at a clock speed of 4 $f_d$.

As stated earlier, the parallel implementation allows for multiple phase crossings in a single clock cycle whereas the serial implementation allows for only one phase crossing per clock cycle. In other words, at any given clock cycle, the parallel implementation output range (at the adder output) is 0 to n. But the output of the serial implementation (at the OR gate output) produces only a two level output, either 1 or 0. Therefore, for a given clock frequency $f_S$, the parallel implementation covers the frequency deviation range of $+/-n(f_s/4)$ Hz whereas the serial implementation can cover the frequency range of $+/-(f_s/4)$ Hz. In other words, at any given clock frequency, the frequency range of the parallel implementation is n times more than that of the serial implementation.

VI. Alternatives to the Described Embodiment of the Present Invention

There are, of course, alternatives to the described embodiment which are within the reach of one of ordinary skill in the relevant art. The present invention is intended to be limited only by the claims presented below.

Thus, what has been disclosed is a demodulation circuit.

What is claimed is:

1. An apparatus for demodulation of modulated signals comprising:
   (a) a radio frequency RF circuit having as an input a modulated signal and providing as an output a first baseband signal I and a second baseband signal Q;
   (b) a demodulation device having a first input coupled to receive said first baseband signal I and a second input coupled to receive said second baseband signal Q, said demodulation device having an output providing zero crossing detection signals for said first baseband signal I, said second baseband signal Q, a first phase shifted baseband signal I prime I' and a second phase shifted baseband signal Q prime Q', wherein said demodulation device comprises
  a first and a second phase detector, said first phase detector having a first input coupled to receive said first baseband signal I, a second input coupled to receive said second baseband signal Q, and a first phase detector output;
  said second phase detector having a first input coupled to receive said first phase shifted baseband signal I prime I', a second input coupled to receive said second phase shifted baseband signal Q prime Q', and a second phase detector output.

2. An apparatus for demodulation of modulated signals comprising:
  a radio frequency RF circuit having as an input a modulated signal and providing as an output a first baseband signal I and a second baseband signal Q;
  a demodulation device having a first input coupled to receive said first baseband signal I and a second input coupled to receive said second baseband signal Q, said demodulation device having an output providing zero crossing detection signals for said first baseband signal I, said second baseband signal Q, a first phase shifted baseband signal I prime I' and a second phase shifted baseband signal Q prime Q',
  wherein the RF circuit further comprises:
    an image reject filter having an input coupled to receive said modulated signal and an output providing a filtered modulated signal;
    a first mixer having a first input coupled to receive said filtered modulated signal, a second input coupled to receive local oscillator signal, and an output to provide a IF frequency signal;
    an IF having an input coupled to receive said IF frequency signal and an output to provide a filtered IF signal;
    an amplifier having an input coupled to receive said filtered IF signal and having an output to provide an amplified signal;
    a divider having an input coupled to receive said oscillator signal, a first output providing a first divided local oscillator signal and a second output providing a second divided local oscillator signal, said second divided clock signal phase shifted from said first divided local oscillator signal by 90 degrees;
    a second mixer having a first input coupled to receive said amplified signal and a second input coupled to receive said first divided local oscillator signal and an output for providing said first baseband signal I; and
    a third mixer having a first input coupled to receive said amplified signal and a second input coupled to receive said second divided local oscillator signal and an output for providing said second baseband signal Q.

3. The apparatus as recited by claim 1 wherein said output of said demodulation device provides zero crossing detection signals for said first baseband signal I, said second baseband signal Q, a first plurality of phase shifted baseband signals I prime I' and a second plurality of phase shifted baseband signals Q prime Q'.

4. The apparatus as recited by claim 1 wherein said demodulation device comprises:
  a) a first filter having an input coupled to receive said first baseband signal and an output to provide a filtered first baseband signal I;
  b) a second filter having an input coupled to receive said second baseband signal Q and an output to provide a filtered second baseband signal Q;
  c) a limiter/phase shifter/detector circuit having a first input coupled to receive a first derived signal derived from said filtered first baseband signal I and a second input coupled to receive a second derived signal derived from said filtered second baseband signal Q.

5. The apparatus as recited by claim 1 wherein said first phase detector output and said second phase detector output are coupled to an OR gate.

6. The apparatus as recited by claim 1 wherein said first phase detector output and said second phase detector output are coupled to an adder.

7. A pager comprising:
  a receive antenna;
  a radio frequency RF circuit having as an input a modulated signal and providing as an output a first baseband signal I and a second baseband signal Q;
  a demodulation device having a first input coupled to receive said first baseband signal I and a second input coupled to receive said second baseband signal Q, said demodulation device having an output providing zero crossing detection signals for said first baseband signal I, said second baseband signal Q, a first phase shifted baseband signal I prime I' and a second phase shifted baseband signal Q prime Q', wherein said demodulation device comprises a first and a second phase detector,
    said first phase detector having a first input coupled to receive said first baseband signal I, a second input coupled to receive said second baseband signal Q, and a first phase detector output;
    said second phase detector having a first input coupled to receive said first phase shifted baseband signal I prime I', a second input coupled to receive said second phase shifted baseband signal Q prime Q', and a second phase detector output; and
  an decoder circuit having an input coupled to receive said zero crossing signals, said decoder circuit having an output providing binary decoded bits.

8. A pager comprising:
  a receive antenna;
  a radio frequency RF circuit having as an input a modulated signal and providing as an output a first baseband signal I and a second baseband signal Q;
  a demodulation device having a first input coupled to receive said first baseband signal I and a second input coupled to receive said second baseband signal Q, said demodulation device having an output providing zero crossing detection signals for said first baseband signal I, said second baseband signal Q, a first phase shifted baseband signal I prime I' and a second phase shifted baseband signal Q prime Q'; and
  an decoder circuit having an input coupled to receive said zero crossing signals, said decoder circuit having an output providing binary decoded bits,
  wherein said RF circuit further comprises:
    an image reject filter having an input coupled to receive said modulated signal and an output providing a filtered modulated signal;

a first mixer having a first input coupled to receive said filtered modulated signal, a second input coupled to receive local oscillator signal, and an output to provide a IF frequency signal;

an IF having an input coupled to receive said IF frequency signal and an output to provide a filtered IF signal;

an amplifier having an input coupled to receive said filtered IF signal and having an output to provide an amplified signal;

a divider having an input coupled to receive said oscillator signal, a first output providing a first divided local oscillator signal and a second output providing a second divided local oscillator signal, said second divided clock signal phase shifted from said first divided local oscillator signal by 90 degrees;

a second mixer having a first input coupled to receive said amplified signal and a second input coupled to receive said first divided local oscillator signal and an output for providing said first baseband signal I; and a third mixer having a first input coupled to receive said amplified signal and a second input coupled to receive said second divided local oscillator signal and an output for providing said second baseband signal Q.

9. The pager as recited by claim 7 wherein said output of said demodulation device provides zero crossing detection signals for said first baseband signal I, said second baseband signal Q, a first plurality of phase shifted baseband signals I prime I' and a second plurality of phase shifted baseband signals Q prime Q'.

10. The pager as recited by claim 7 wherein said demodulation device comprises:

a) a first filter having an input coupled to receive said first baseband signal and an output to provide a filtered first baseband signal I;

b) a second filter having an input coupled to receive said second baseband signal Q and an output to provide a filtered second baseband signal Q;

c) a limiter/phase shifter/detector circuit having a first input coupled to receive said a first derived signal derived from said filtered first baseband signal I and a second input coupled to receive a second derived signal derived from said filtered second baseband signal Q.

11. The pager as recited by claim 7 wherein said first phase detector output and said second phase detector output are coupled to an OR gate.

12. The pager as recited by claim 7 wherein said first phase detector output and said second phase detector output are coupled to an adder.

13. A circuit comprising:

a first input coupled to receive a first signal I;

a second input coupled to receive a second signal Q;

an output providing a signal derived from said first signal I, said second signal Q, a third signal I prime and a fourth signal Q prime where I prime has a phase relationship derived from said first signal I and said second signal Q and Q prime has a phase relationship derived from said first signal I and said second signal Q, wherein said output is derived from said first signal I, said second signal Q, a plurality of third signals I $\text{prime}_1$ to I $\text{prime}_n$ and a forth plurality of signals Q $\text{prime}_1$ to Q $\text{prime}_n$ where said third plurality of signals have a phase relationship to said first signal I and said fourth plurality of signals have a phase relationship to said second signal Q.

14. The circuit as recited by claim 13 wherein said second signal Q is a phase shifted version of said first signal I with a phase shift equal to 90 degrees.

15. The circuit as recited by claim 13 wherein said third signal I prime and said fourth signal Q prime are derived from said first signal I, said second signal Q and an arbitrary phase angle A such that I prime=I cos (A)–Q sin (A); and Q prime=I sin (A)+Q cos (A).

16. The circuit as recited by claim 15 where functions cos(A) and sin(A) are derived by gain blocks.

17. The circuit as recited by claim 13 wherein said output is a set of zero crossing signals.

* * * * *